(12) United States Patent
Rawlins et al.

(10) Patent No.: US 9,036,676 B2
(45) Date of Patent: May 19, 2015

(54) CATALYTIC GENERATION OF METASTABLE SINGLET OXYGEN

(71) Applicant: Physical Sciences, Inc., Andover, MA (US)

(72) Inventors: W. Terry Rawlins, Reading, MA (US); Seonkyung Lee, Boston, MA (US); Steven J. Davis, Londonderry, NH (US)

(73) Assignee: Physical Sciences, Inc., Andover, MA (US)

( * ) Notice: Subject to any disclaimer, the term of this patent is extended or adjusted under 35 U.S.C. 154(b) by 0 days.

(21) Appl. No.: 14/156,531

(22) Filed: Jan. 16, 2014

(65) Prior Publication Data

US 2014/0185642 A1    Jul. 3, 2014

Related U.S. Application Data

(62) Division of application No. 12/492,912, filed on Jun. 26, 2009, now Pat. No. 8,670,475.

(60) Provisional application No. 61/075,995, filed on Jun. 26, 2008.

(51) Int. Cl.
| | |
|---|---|
| *H01S 3/223* | (2006.01) |
| *H01S 3/03* | (2006.01) |
| *C01B 13/02* | (2006.01) |
| *H01S 3/22* | (2006.01) |
| *H01S 3/0953* | (2006.01) |
| *H01S 3/036* | (2006.01) |

(52) U.S. Cl.
CPC .............. *H01S 3/0305* (2013.01); *C01B 13/02* (2013.01); *H01S 3/2215* (2013.01); *H01S 3/0953* (2013.01); *H01S 3/036* (2013.01)

(58) Field of Classification Search
CPC ......... C01B 13/02; H01S 3/03; H01S 3/0305; H01S 3/2215; H01S 3/0953; H01S 3/036
USPC ....................................... 372/55, 58
See application file for complete search history.

(56) References Cited

U.S. PATENT DOCUMENTS

| | | | |
|---|---|---|---|
| 6,377,600 B1 | 4/2002 | Flegal | |
| 7,274,724 B2 | 9/2007 | Carroll et al. | |
| 2005/0069011 A1 | 3/2005 | Hill | |
| 2006/0078032 A1* | 4/2006 | Carroll et al. | 372/89 |
| 2008/0317999 A1 | 12/2008 | Patchett et al. | |

OTHER PUBLICATIONS

A. D. Palla, et al., "ElectricOIL Discharge and Post-Discharge Kinetics Experiments and Modeling" Proc. SPIE, vol. 6454, pp. 645401-1 to 645401-12 (2007).
D. L. Carroll et al., "Continuous-Wave Laser Oscillation on the 1315 nm Transition of Atomic Iodine Pumped by $O_2(a^1\Delta)$ Produced in an Electric Discharge," Applied Physics Letters, vol. 86, pp. 111104 to 1111104-3 (2005).

(Continued)

*Primary Examiner* — Yuanda Zhang
(74) *Attorney, Agent, or Firm* — Proskauer Rose LLP

(57) ABSTRACT

Singlet oxygen metastables can be formed. A catalytic coating is formed on an interior surface of a flow reactor, and an oxygen containing species is flowed into the flow reactor to produce singlet oxygen metastables by a chemical reaction in the presence of the catalytic coating.

6 Claims, 15 Drawing Sheets

(56) References Cited

OTHER PUBLICATIONS

D. L. Carroll et al., "Measurement of Positive Gain on the 1315 nm Transition of Atomic Iodine Pumped by $O_2(a^1\Delta)$ Produced in an Electric Discharge," Applied Physics Letter vol. 85, No. 8, pp. 1320 to 1322 (2004).

D. L. Carroll et al., "Path to the Measurement of Positive Gain on the 1315-nm Transition of Atomic Iodine Pumped by $O_2(a^1\Delta)$ Produced in an Electric Discharge," IEEE Journal Quantum Electronics, vol. 41, No. 2, pp. 213 to 223 (2005).

D.L. Carroll et al., "Studies of CW Laser Oscillation on the 1315-nm Transition of Atomic Iodine Pumped by $O_2(a^1\Delta)$ Produced in an Electric Discharge", IEEE Journal Quantum Electronics, vol. 41, No. 10, pp. 1309 to 1318 (2005).

D.S. Stafford et al., "$O_2(^1\Delta)$ Production in He/$O_2$ Mixtures in Flowing Low Pressure Plasmas," Journal of Applied Physics, vol. 96, No. 5, pp. 2451 to 2465 (2004).

F. C. Fehsenfeld et al., "Microwave Discharge Cavities Operating at 2450 MHz," The Review of Scientific Instruments, vol. 36, No. 3, pp. 294 to 298 (1965).

F. Kaufman, "The Production of Atoms and Simple Free Radicals in Glow Discharges," Advances in Chemistry Series 80, pp. 29 to 47 (1969).

G. F. Benavides et al., "Hybrid ElectricOIL Discharge, Gain, and Power Enhancements," AIAA 2007-4623, pp. 1281 to 1291 (2007).

J. W. Zimmerman et al, "Important Kinetic Effects in the Hybrid ElectricOIL System", Proc. of SPIE, vol. 6261, pp. 62611R-1 to 62611R-12, (2006).

K. Tachibana et al., "Excitation of the $O_2(a^1\Delta_g)$ State by Low Energy Electrons," J. Chem. Phys., vol. 75, No. 7, pp. 3315-3320 (1981).

L. S Frost, . "Momentum-Transfer Cross Sections for Slow Electrons in He, Ar, Kr, and Xe from Transport Coefficients," Physical Review, vol. 136, No. 6A, pp. 1538 to 1545 (1969).

P.C. Cosby, "Electron-Impact Dissociation of Oxygen," J. Chem. Phys., vol. 98, No. 12, pp. 9560 to 9569 (1993).

R. N. Franklin, "The Role of $O_2(a^1\Delta_g)$ Metastables and Associative Detachment in Discharges in Oxygen," J. Phys. D: Appl. Phys., vol. 34, pp. 1834 to 1839 (2001).

S.A. Lawton, "Excitation of the $b^1\Sigma^{30}{}_g$ State of $O_2$ by Low Energy Electrons," J. Chem. Phys. 69, No. 3, pp. 1055-3320 (1978).

W. L. Morgan et al., "ELENDIF: A Time-Dependent Boltzmann Solver for Partially Ionized Plasmas," Computer Physics Communications, vol. 58, pp. 127 to 152 (1990).

W. T. Rawlins et al., "Advanced Diagnostics and Kinetics of Oxygen-Iodine Laser Systems," American Institute of Aeronautics and Astronautics Paper No. AIAA-2005-5299, pp. 1-17 (2005).

W. T. Rawlins et al, "Dynamics of Vibrationally Excited Ozone Formed by Three-Body Recombination. II. Kinetics and Mechanism," J. Chem. Phys., vol. 87, No. 9, 5209 to 5221 (1987).

W. T. Rawlins et al., "Observations of Gain on the $I(^2P_{frax;1;2} \rightarrow {}^2P_{frax;3;2})$ Transition by Energy Transfer from $O_2(a^1\Delta_g)$ Generated by a Microwave Discharge in a Subsonic Flow Reactor," Applied Physics Letters, vol. 86, pp. 051105-1 to 051105-3 (2005).

W. T. Rawlins et al., "Production of Metastable Singlet Oxygen in the Reaction of Nitric Oxide with Active Oxygen," Proc. SPIE, vol. 6874, pp. 68740B-1 to 68740B-11, (2008).

W. T. Rawlins et al., "Spectroscopic Studies of a Prototype Electrically Pumped COIL System," SPIE, vol. 5334, Paper No. 12, pp. 88 to 98 (2004).

W. T. Rawlins et al., "Kinetics of Oxygen Discharges and $I(^2P\ \frac{1}{2})$ Excitation for EOIL," Proc. SPIE, vol. 6454, pp. 64540H-1 to 64540H-12, (2007).

W. T. Rawlins et al., "The Electric Oxygen-Iodine Laser: Chemical Kinetics of $O^2(a^1\Delta)$ Production and $I(^2P\ \frac{1}{2})$ Excitation in Microwave Discharge Systems," Proc. SPIE, vol. 6101, pp. 610011W-1 to 610011W-14 (2006).

M. Endo et al., "Output Power Enhancement by the Injection of Dissociated Iodine in Supersonic Chemical Oxygen-Iodine Laser", Proc. SPIE, vol. 3612, pp. 56-61 (Jan. 1999).

S. J. Davis et al., "EOIL Power Scaling in a 1-5 kW Supersonic Discharge Flow Reactor", Proc. of SPIE, vol. 6874, pp. 68740D-1-68740D-11.

\* cited by examiner

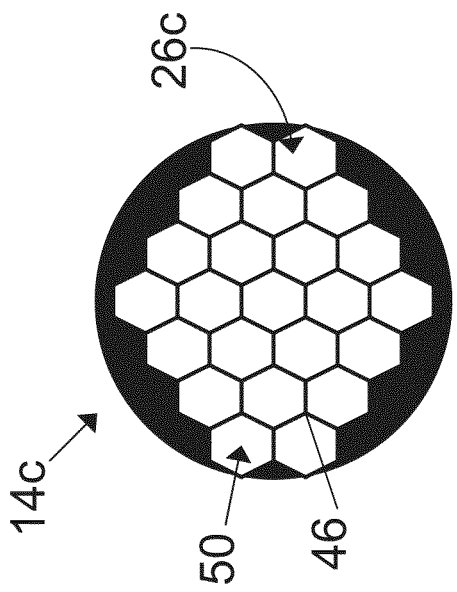
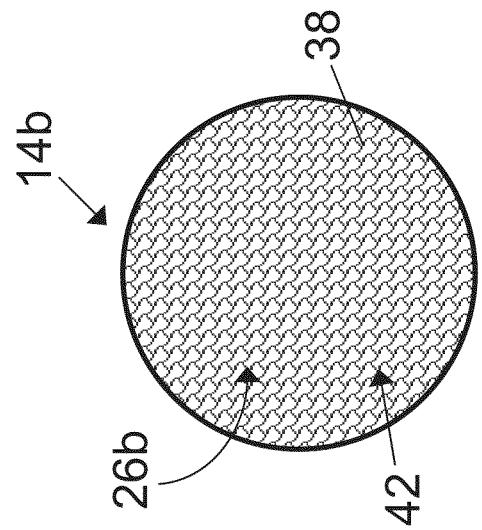
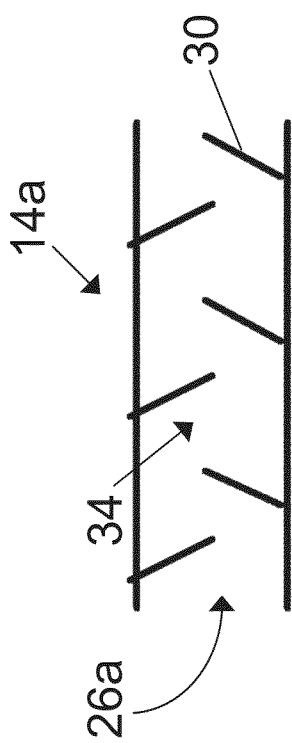
Figure 2C
Figure 2B
Figure 2A

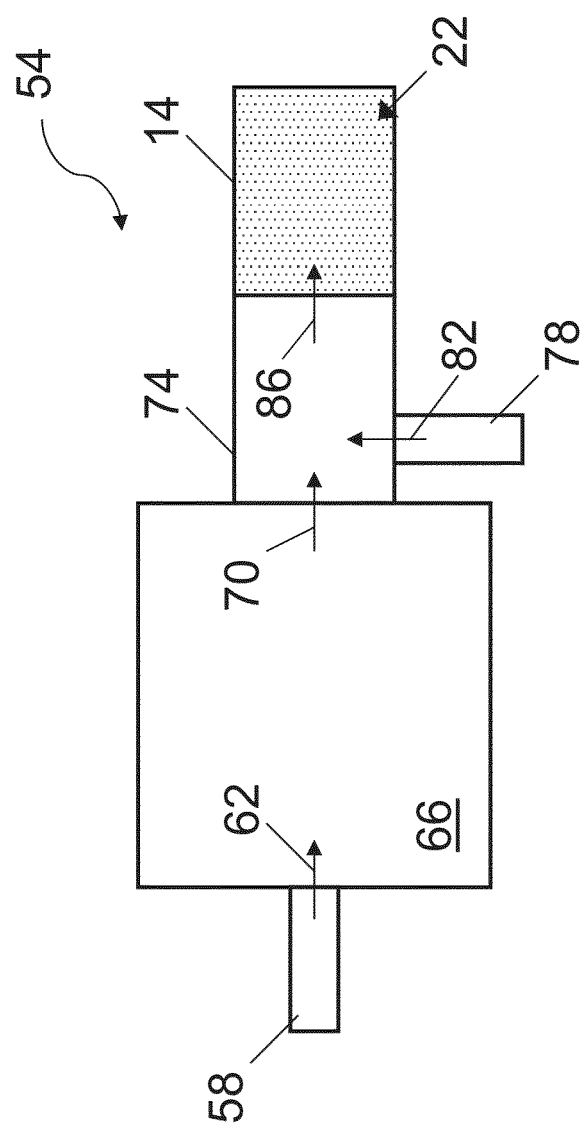

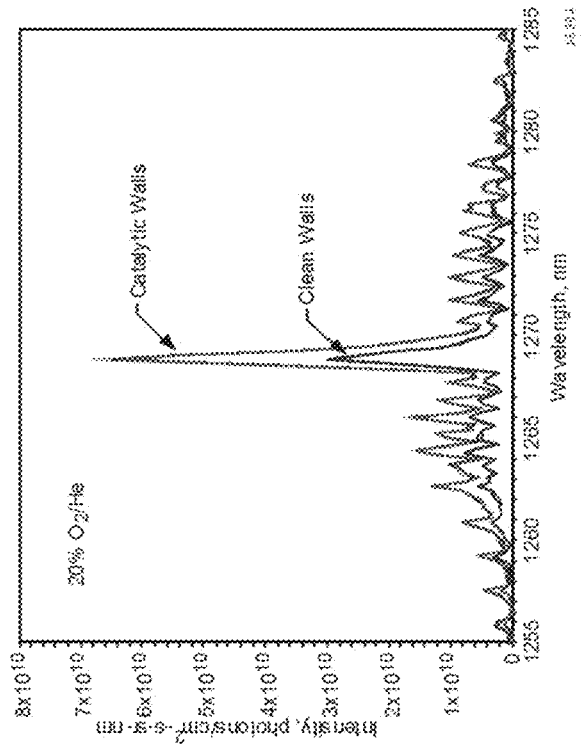
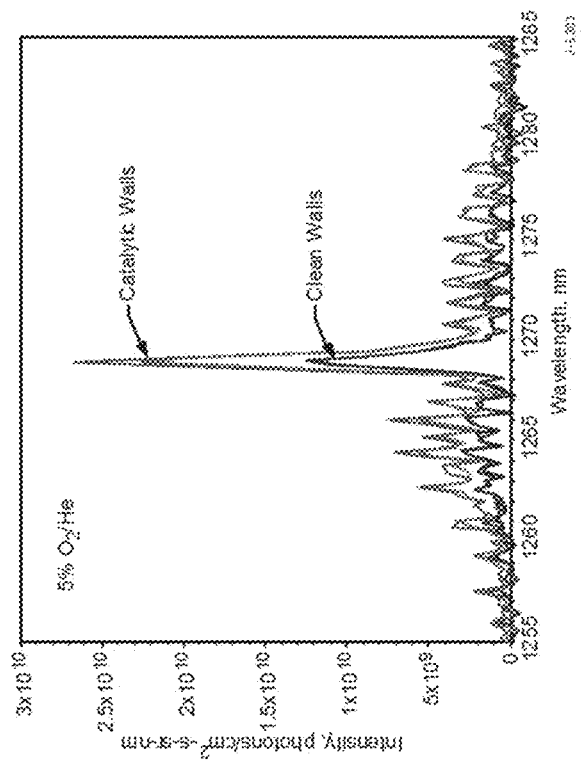
Figure 7A
Figure 7B

CATALYTIC GENERATION OF METASTABLE SINGLET OXYGEN

CROSS-REFERENCE TO RELATED APPLICATIONS

This application is a divisional of U.S. patent application Ser. No. 12/492,912, filed Jun. 26, 2009, which claims the benefit of and priority to U.S. Provisional Application No. 61/075,995 filed Jun. 26, 2008, both of which are owned by the assignee of the instant application and the disclosures of which are incorporated herein in their entireties.

GOVERNMENT RIGHTS

This invention was made with government support under Contract No. HR001-07-C-0054, awarded by the Defense Advanced Research Projects Agency. The government may have certain rights in the invention.

FIELD OF THE INVENTION

The invention relates generally to generating singlet oxygen metastables, $O_2(a)$, in an enclosed container, and more particularly, to generating energetic singlet oxygen metastables in a catalytically coated flow reactor, e.g., for use in an Electric Oxygen-Iodine Laser (EOIL) system.

BACKGROUND OF THE INVENTION

The Electric Oxygen-Iodine Laser (EOIL) system is an emerging concept for a compact, closed-cycle, all-gas-phase, energy transfer laser with high-power military and industrial applications. EOIL uses an electric discharge of a flowing oxygen gas mixture to generate singlet oxygen metastables, $O_2(a^1\Delta_g)$, and atomic oxygen, which subsequently react with molecular iodine to excite the atomic iodine lasing transition, $I(^2P_{1/2} \rightarrow {}^2P_{3/2})$, at 1.315 μm. An EOIL has been used for positive gain and lasing in low-power laboratory systems. An EOIL reactor driven by a Microwave Driven Jet (MIDJet) (e.g., as available from Physical Sciences, Inc. (PSI) in Andover, Mass.) with a kW-power microwave discharge source can generate lasing in a supersonic flow. The $I(^2P_{1/2})$ (or I*) excitation mechanism in EOIL is similar to that for the Chemical Iodine Oxygen Laser (COIL), except that dissociation of the reagent $I_2$ occurs through rapid reactions with atomic oxygen rather than the much less efficient energy transfer from $O_2(a)$. COIL systems use an aqueous chemical process to generate $O_2(a)$, so no atomic oxygen is present, and $I_2$ is dissociated by a complex multi-step process that consumes some of the $O_2(a)$.

SUMMARY OF THE INVENTION

The invention, in one embodiment, generates energetic singlet oxygen metastables, $O_2(a^1\Delta_g)$, in the effluent flow of electric discharges. The invention can be implemented in an Electric Oxygen-Iodine Laser (EOIL) system by coating the interior surfaces of a flow reactor with a catalyst. In certain embodiments, the catalyst can provide energetic singlet oxygen metastables from an oxygen containing species (e.g., atomic oxygen or molecular oxygen). For certain combinations of discharge conditions, gas composition, injected iodine concentrations, and flow reactor interior surface roughness, an iodine oxide coating can form on the interior surface of the flow reactor. The coating can be a catalyst for an oxygen containing species to form singlet oxygen, thus enhancing singlet oxygen metastables yield.

In one aspect, there is a method for forming singlet oxygen metastables. A catalytic coating is formed on an interior surface of a flow reactor, and an oxygen containing species is flowed into the flow reactor to produce singlet oxygen metastables by a chemical reaction in the presence of the catalytic coating.

In another aspect, there is a catalytic reactor cavity including an interior surface and a catalytic coating disposed on the interior surface. The catalytic coating is adapted to produce energetic singlet oxygen metastables by a chemical reaction from an oxygen containing species.

In another aspect, there is a laser device including an optical resonator, an electrically driven discharge device, a catalytic reactor cavity and a source for a second gas. The electrically driven discharge device is configured to produce energetic singlet oxygen metastables and an oxygen containing species. The catalytic reactor cavity is disposed relative to the electrically driven discharge device. The catalytic reactor cavity includes an interior surface having a catalytic coating adapted to produce additional energetic singlet oxygen metastables. The source for a second gas is disposed between the optical resonator and the catalytic reactor cavity. The second gas reacts with the energetic singlet oxygen metastables and the additional energetic singlet oxygen metastables to form an excited species in an amount sufficient to support lasing of the excited species in the optical resonator.

In other examples, any of the aspects above or any apparatus, system or device or any method, process or technique described herein can include one or more of the following features.

The catalytic coating can include an oxygen and iodine containing species in a ratio of about 2:1. The catalytic coating can include at least one of $I_2O_4$ and $I_4O_9$. The oxygen containing species can include atomic oxygen. The catalytic coating can be formed by a chemical reaction of an iodine containing species (e.g., molecular iodine) with the oxygen containing species.

The interior surface of the cavity can include a roughened surface. An inner volume of the flow reactor can define a structure comprising the interior surface configured to receive the catalytic coating. The structure can define a shape (i) including at least one wall having a high surface area and (ii) defining at least one aperture having high flow conductance. The structure can include or can be a vane, a sponge or a honeycomb shape.

In certain embodiments, the structure includes a vane having members extending radially inward from the inner surface. The members are adapted (i) to provide a surface to receive the catalytic coating and (ii) to not substantially impede a flow of a fluid through an inner volume of the catalytic reactor cavity.

In certain embodiments, the structure includes a sponge shape having a porous structure including multiple surfaces and defining multiple pores. The multiple surfaces are adapted (i) to provide a surface to receive the catalytic coating and (ii) to not substantially impede a flow of a fluid through the pores of the catalytic reactor cavity.

In certain embodiments, the structure includes a honeycomb shape having multiple walls and defining multiple apertures. The multiple walls are adapted (i) to provide a surface to receive the catalytic coating and (ii) to not substantially impede a flow of a fluid through the apertures of the catalytic reactor cavity.

The catalytic coating can be formed by one or more chemical reactions of an iodine containing species (e.g., atomic iodine, molecular iodine, a molecule or compound containing iodine, or a combination thereof) with the oxygen containing species (e.g., by directing molecular iodine into the flow reactor). The oxygen containing species can be atomic oxygen or molecular oxygen, a combination thereof.

The catalytic coating can establish significant improvements in EOIL gain and power efficiency. A two-fold increase in the singlet oxygen metastable yields was observed over values obtained for non-catalytic coating conditions, with yields exceeding 40% in some cases. Even higher singlet oxygen metastables yields can be attained by optimizing discharge and flow conditions. Spectroscopic observations indicate that a basic mechanism for an increase in the singlet oxygen metastables yields is recombination of a discharge-generated oxygen containing species on the catalytic coating surface to produce singlet oxygen metastables in the gas phase.

Catalytic generation of singlet oxygen metastables can be applied to any electric discharge-based singlet oxygen metastables generator concept. Application of the catalytic coating to EOIL systems can provide hybrid, high-energy gas lasers.

The details of one or more examples are set forth in the accompanying drawings and the description below. Further features, aspects, and advantages of the invention will become apparent from the description, the drawings, and the claims.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2A is a side, sectional view of a cavity for receiving a catalytic coating.

FIG. 2B is a cross-sectional view of another cavity for receiving a catalytic coating.

FIG. 2C is a cross-sectional view of another cavity for receiving a catalytic coating.

FIG. 3 is a cross-sectional view of an apparatus for forming a catalytic coating.

FIGS. 7A and 7B are graphical views of rotationally resolved emission spectra from the $O2(a \rightarrow X)$ system in the absence and presence of the catalytic wall coating, for a discharge gas mixture of 5% $O_2$ in He and 20% $O_2$, respectively, in He at 1.5 Torr and 2 mmole/s.

DESCRIPTION OF THE INVENTION

A catalytic coating on an interior surface of a flow reactor can act as a catalyst for an oxygen containing species. The catalytic coating can be used in high power, high efficiency lasers.

Figure 1:
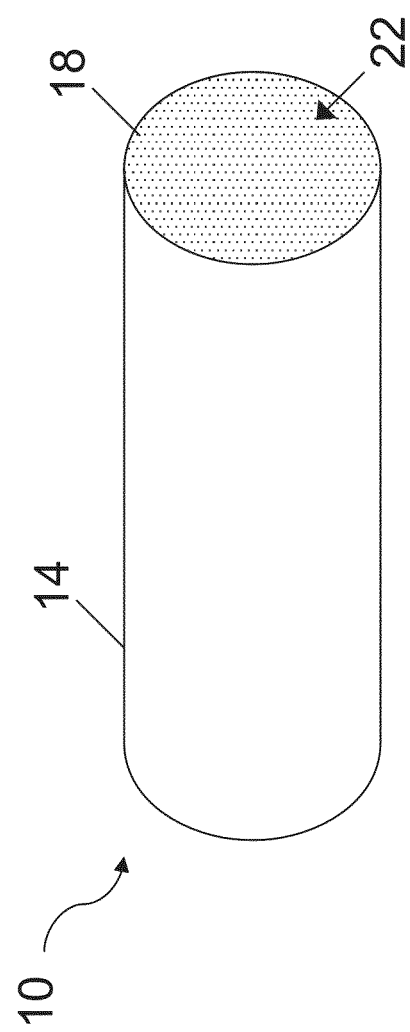
FIG. 1 is a plan view of an apparatus for receiving a catalytic coating.

FIG. 1 shows an apparatus 10 for receiving a catalytic coating. The apparatus can be or include a cavity 14 that can define an interior volume and can include an interior surface 18, on which a catalytic coating 22 can be formed. The catalytic coating 22 can produce energetic singlet oxygen metastables by one or more chemical reactions. The chemical reactions can include a reaction of an oxygen containing species on a surface of the catalytic coating 22.

The cavity 14 can be a flow tube, flow reactor, and/or a catalytic reactor cavity. The cavity can have a circular or polygonal cross section (e.g., triangular, square, hexagonal, etc.). The cavity 14 can be about 1 inch to about 24 inches in length, although any length can be used depending on the application. The cavity 14 can be about 0.5 inch to 12 inches in diameter, although any diameter can be used depending on the application. In certain embodiments, the cavity 14 can be about 2 inches in diameter.

In certain embodiments, the cavity 14 can be a metallic, plastic, ceramic and/or glass (e.g., Pyrex) material. The cavity 14 can include a roughened surface. For example, the cavity 14 can be a roughened glass surface on which the catalytic coating 22 is deposited.

The catalytic coating 22 can be formed by depositing the coating on the interior surface 18. The catalytic coating 22 can be formed by a chemical reaction of an iodine containing species with the oxygen containing species. The iodine containing species can be molecular iodine or atomic iodine (either being in a ground state or an excited state). The oxygen containing species can be molecular oxygen or atomic oxygen (either being in a ground state or an excited state). Typically, molecular iodine is reacted with atomic oxygen. The catalytic coating 22 can be an oxygen and iodine containing species in a ratio of about 2:1. For example, the catalytic coating 22 can include one or more of $I_2O_4$, $I_2O_7$, or $I_4O_9$. In certain embodiments, the catalytic coating 22 is $I_2O_4$. In certain embodiments, the catalytic coating 22 is $I_4O_9$. In some embodiments, the catalytic coating 22 is a mixture of $I_2O_4$ and $I_4O_9$.

The inner volume of the cavity 14 can define a structure that includes the inner surface 18, which is configured to receive the catalytic coating 22. FIGS. 2A-2C show cavities 14a, 14b, and 14c, which are exemplary embodiments. Typically, the structure defines a shape that (i) includes at least one wall having a high surface area and that (ii) defines at least one aperture having high flow conductance. Since the catalytic effect can be a surface process, a high surface-to-volume ratio material with a high flow conductance can be inserted into the subsonic flow, downstream of the discharge generators, to provide high gas-surface contact with minimal pressure drop.

FIG. 2A shows a cavity 14a, where the structure 26a has a vane shape. The structure 26a includes members 30 extending radially inward from the inner surface 18. The members 30 are adapted to provide a surface to receive the catalytic coating and to not substantially impede a flow of a fluid (e.g., reactive gases or metastable species) through the inner volume 34 of the cavity 14a.

FIG. 2B shows a cavity 14b, where the structure 26b has a sponge shape or a crushed metal foam shape. The structure 26b includes a porous structure including multiple surfaces 38 and defining multiple pores 42. The multiple surfaces are adapted to provide a surface to receive the catalytic coating and to not substantially impede a flow of a fluid (e.g., reactive gases or metastable species) through the pores of the catalytic reactor cavity.

FIG. 2C shows a cavity 14c, where the structure 26c has a honeycomb shape. The structure 26c includes multiple walls 46 and defines multiple apertures 50. The multiple walls are adapted to provide a surface to receive the catalytic coating and to not substantially impede a flow of a fluid (e.g., reactive gases or metastable species) through the apertures of the catalytic reactor cavity.

FIG. 3 shows an apparatus 54 for forming a catalytic coating 22. The apparatus 54 includes a source 58 to introduce a gas 62 into an electrically driven discharge 66, which provides a reactive gas 70 to a flow tube 74. A source 78 introduces a second gas 82 to the flow tube 74 so that it can react with the reactive gas 70 and produce a species 86 that can deposit on the cavity 14 to form the catalytic coating 22.

The electrically driven discharge 66 can be an electric discharge for generating singlet oxygen metastable, including microwave, radio-frequency, pulser-sustainer, or avalanche (poker) discharges, or a MIDJet singlet oxygen metastable generator. An exemplary microwave driven discharge device is described in U.S. Pat. No. 5,793,013 to Read et al., the entire disclosure of which is herein incorporated by reference in its entirety.

Figure 4:
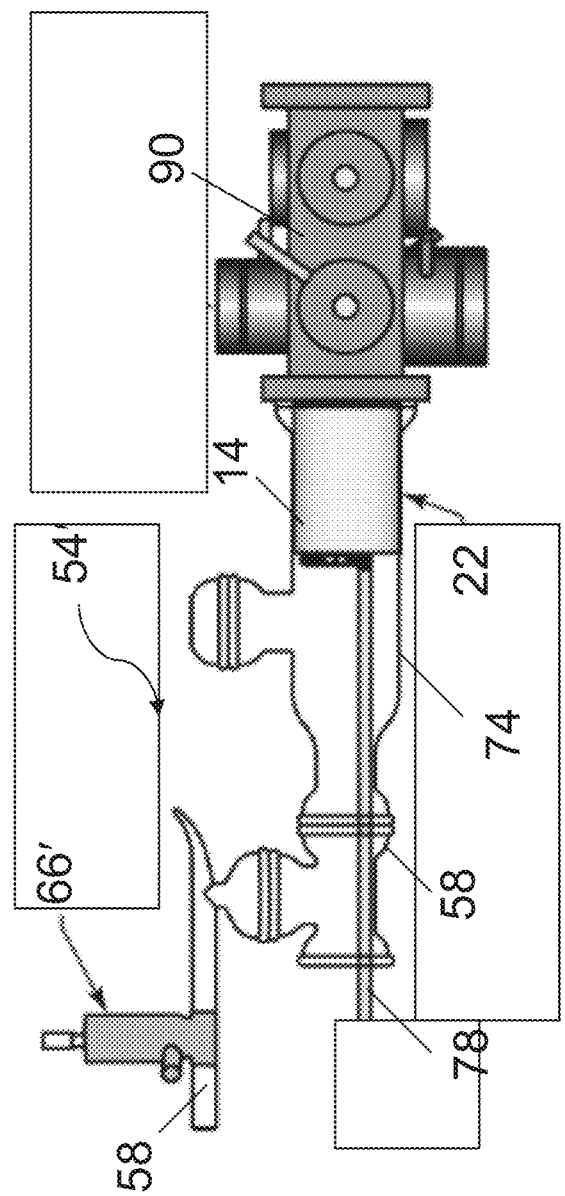
FIG. 4 is a plan view of another apparatus for forming a catalytic coating.

FIG. 4 shows another apparatus 54' for forming a catalytic coating 22. The electrically driven discharge 66' can be a microwave discharge including an Evenson-style resonant cavity. The main gas flow into the microwave discharge 66' can be a mixture of $O_2$ in He at 2 mmole/s and 1.5 Torr. The gas mixture flows through a section of 1.4 cm (o.d.) glass tubing 58 that contains a 2450 MHz microwave discharge at 70-110 W power, and then into a 5 cm (i.d.) glass flow reactor 74. The discharge effluent in the flow reactor contained $O_2(a)$ and O at similar concentrations of about $5-10 \times 10^{14}$ $cm^{-3}$, trace amounts of $O_2(b1\Sigma)$ (~$10^{12}$ $cm^{-3}$), and negligible amounts of $O_3$ (<<$10^{12}$ $cm^3$), as determined by direct measurements of these species concentrations. Ions and short-lived metastable species produced in the discharge are rapidly removed by gas phase and wall collisions upstream of the reaction zone. The coating can catalyze a heterogeneous recombination of O-atoms to form $O_2(a)$.

Upon entering the main flow reactor, including a 5 cm (i.d.) etched glass tube, $I_2$ was added through a movable loop injector 78. $I_2$ vapor was generated by passing a flow of helium over a bed of iodine crystals. The iodine source was maintained at room temperature, resulting in $I_2$ flow rates of 0.09 to 1.3 μmole/s and initial $I_2$ concentrations in the main flow reactor of $2 \times 10^{12}$ to $3 \times 10^{13}$ $cm^{-3}$. A typical flow velocity is about 1250 cm/s.

The reactive species concentrations can be determined by optical methods at an upstream window port of a diagnostic cell 90. The $O_2(a)$ and I* concentrations can be determined from the intensities of the $O_2(a \rightarrow X)$ emission band centered at 1.27 μm and the I* emission feature at 1.315 μm, respectively, observed at 0.3 nm spectral resolution using a fiber-coupled InGaAs array spectrometer calibrated for absolute spectral responsivity. Spectral fitting analysis of the rotational distributions of the $O_2(a \rightarrow X)$ spectra can provide a measure of the rotational, and therefore, gas temperature. The diagnostic cell can be stainless steel with Teflon-coated inner surfaces.

Atomic oxygen concentrations in the non-catalytic case can be determined from the intensity of the O+NO air-afterglow chemiluminescence observed using a fiber-coupled photometer spectrally filtered at 580 nm. In the absence of $I_2$ injection, $O_2(a)$ emission measurements at several positions along the length of the flow tube show that there is no detectable loss of $O_2(a)$ along the reactor. Analysis of the $O_2(a \rightarrow X)$ spectra give rotational temperatures of 300 to 320 K, indicative of the bulk gas temperature at the optical port. The spectra show no significant vibrational excitation of the $O_2(a)$.

Figure 5:
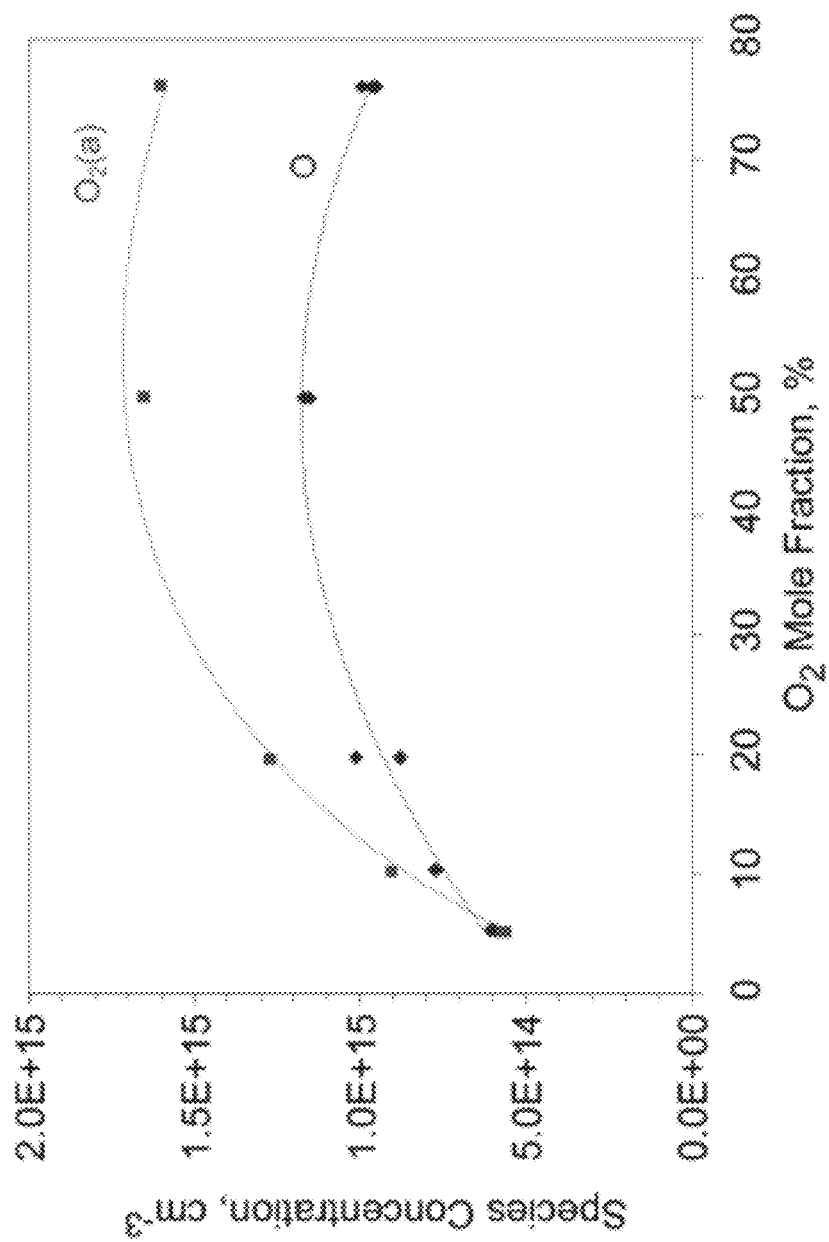
FIG. 5 is a graphical view of concentrations of $O_2(a)$ and O observed in the flow reactor in the absence of the catalytic coating, 1.5 Torr, 2 mmole/s $O_2$+He, and 70 W discharge power.
Figure 6:
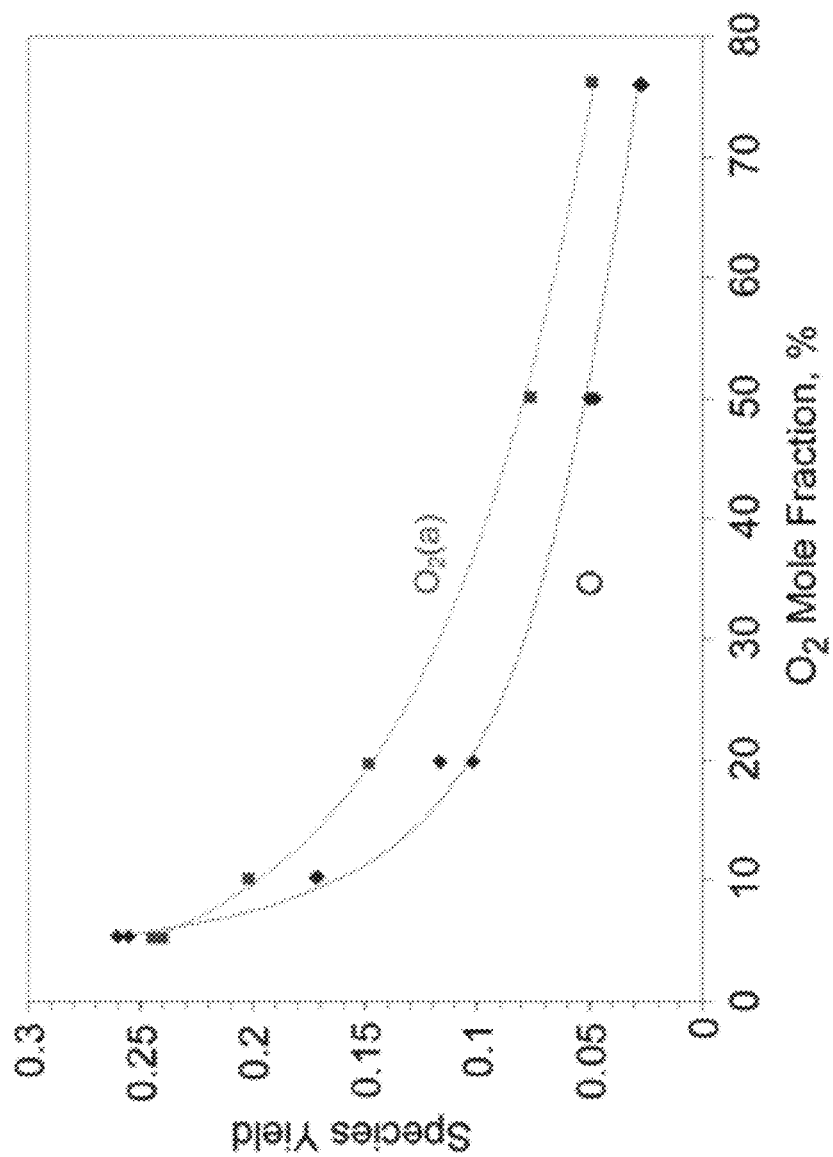
FIG. 6 is a graphical view of $O_2(a)$ and O yields, relative to total initial $O_2$, for the data shown in FIG. 5.

Typical concentrations and yields (relative to the initial $[O_2]_o$) of $O_2(a)$ and O observed in the non-catalytic flow reactor are shown in FIGS. 5 and 6, as functions of $O_2$ mole fraction in He entering the discharge. When $I_2$ is injected into the active-oxygen flow within the etched region of the flow tube, a thin, yellowish film coating is formed on the roughened glass surface. This coating does not form to any significant extent on smooth glass surfaces. Factors that are relevant to the formation of the film can include the roughness of the glass surface, the details of $I_2$ injection and mixing near the walls, and the discharge effluent gas composition.

As the catalytic coating is formed, the $O_2(a)$ emission intensity at the detection window (observed with no $I_2$ flow) increases to a steady value, usually about two times greater than observed in the absence of the film. The yellow film material can be repeatedly removed and regenerated with highly reproducible results for $O_2(a)$ production with and without the coating. This coating surface is stable unless the surface is exposed to air, but the activity can be restored by exposure to the discharge effluent. Analysis of the coating material by X-ray photoelectron spectroscopy (XPS) indicates a composition with O/I of about 2 (e.g., $I_2O_4$ and/or $I_4O_9$). The material is distinctly different from the white crystalline oxide $I_2O_5$ that is commonly observed as a catalytically inactive product in EOIL systems.

With the catalytic coating formed, electrically generated O atoms can be efficiently removed by reaction with the catalytic surface. With the O concentrations greatly reduced, the $I_2$ is more slowly dissociated by a complex mechanism involving energy transfer from $O_2(a)$, in a multi-step process that produces an intense yellow emission. $O_2(a)$ production increases gradually over the time scale of a few minutes until it reaches a constant value roughly twice the initial discharge-produced $O_2(a)$ concentration.

Figure 8:
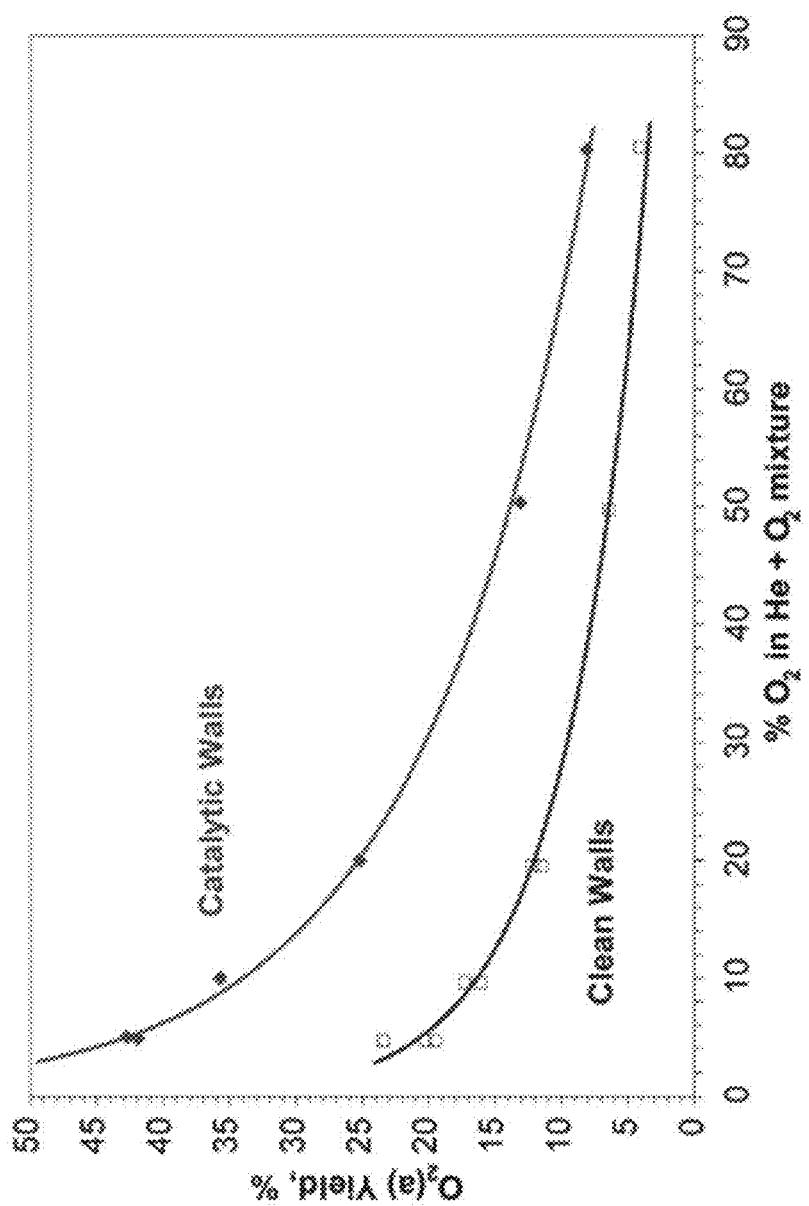
FIG. 8 is a graphical view of a comparison of measured yields of $O_2(a)$ for a clean and coated flow reactor.

FIGS. 7A and 7B shows $O_2(a \rightarrow X)$ emission spectra in the absence and presence of the catalytic coating for 5% $O_2$ in He and 20% $O_2$ in He, respectively. The magnitude of this increase is roughly consistent with reaction of the discharge-produced O atoms on the coated surface to form $O_2(a)$. The large $O_2(a)$ production rates in the coated section indicate that the gas-phase precursor species react on the walls with nearly unit efficiency, i.e. the reaction rate is limited by diffusion to the walls. This effect has been observed for both $O_2$/He and $O_2/N_2$/He discharges over a wide range of mixing ratios with He diluent. FIG. 8 shows a comparison of the $O_2(a)$ yields as functions of $O_2$/He mixing ratio. The factor-of-two enhancement of $O_2(a)$ is observed over the entire range of $O_2$ mole fraction, from 5% to 80%.

Injecting $I_2$ into the catalytically enriched flow just upstream of the measurement port increases the inversion ratios, [I*]/[I]. For example, the ratio can increase from about 0.2 to about 0.4 using a catalytic coating. The ratio can be further increased by removing I* loss processes and O-atom quenching.

Figure 9:
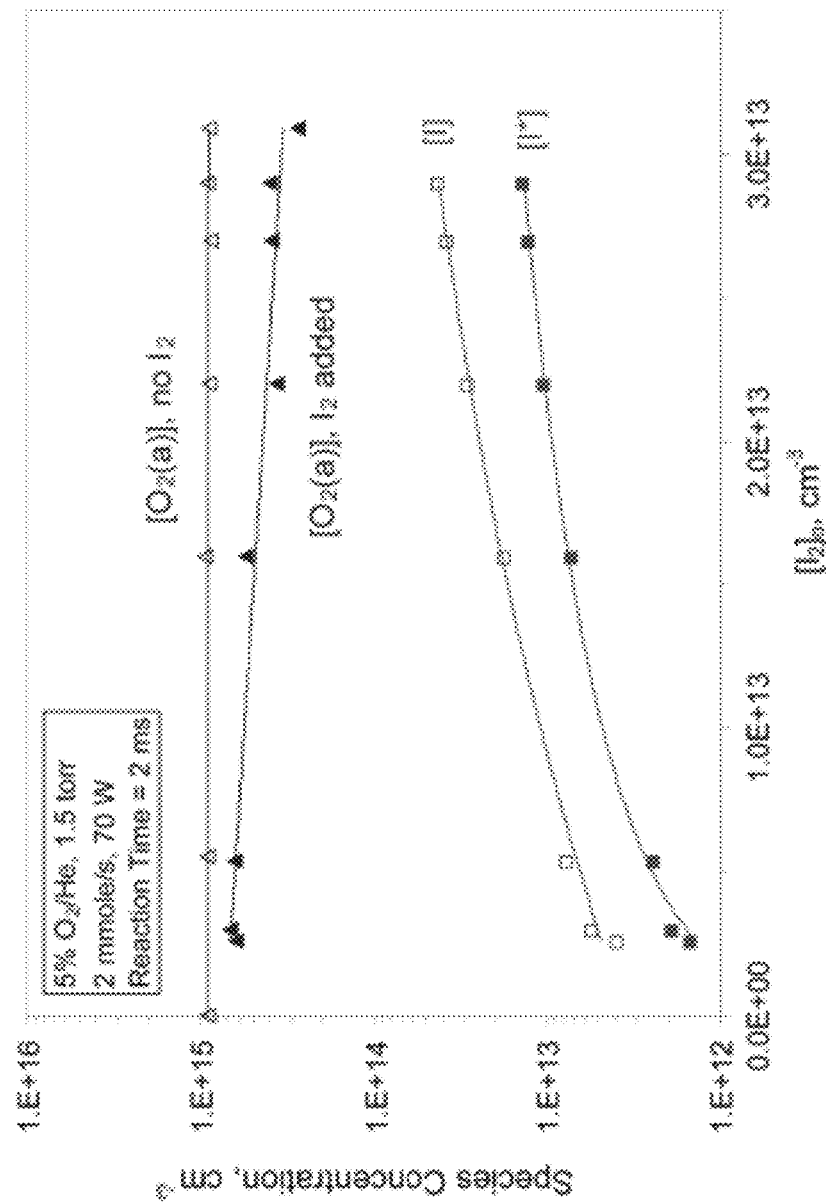
FIG. 9 is a graphical view of observed concentrations of $O_2(a)$, I*, and I for the injection of varied initial concentrations of $I_2$ into catalytically enriched discharge effluent at a fixed reaction time of 2 ms.
Figure 10:
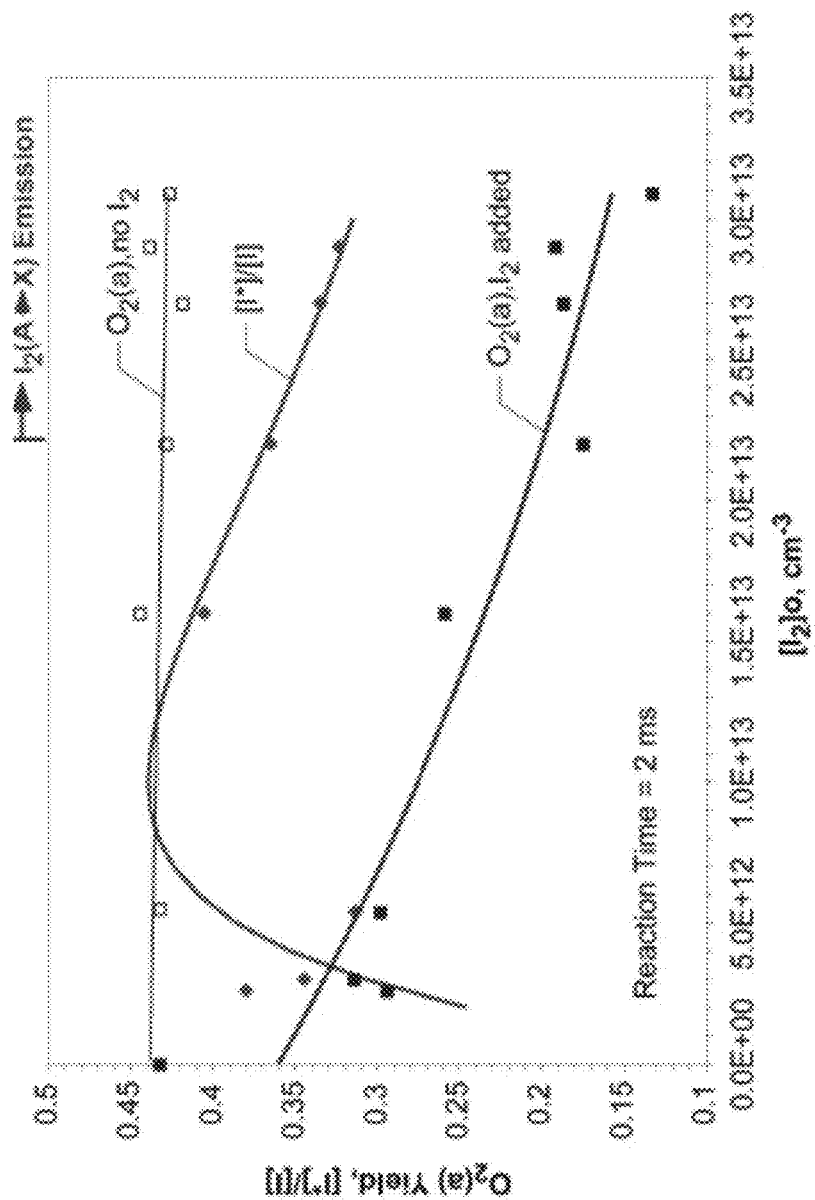
FIG. 10 is a graphical view of $O_2(a)$ yields and I*/I inversion ratios corresponding to the data in FIG. 9.

Results for a fixed reaction time and varied initial $I_2$ concentrations, $[I_2]_o$, are illustrated in FIGS. 9 and 10. An 8-cm-long coated section extended to within ~5 cm of the window, and the $I_2$ was injected 2.5 cm (2 ms) upstream of the center of the window (1.5 cm diameter field-of-view). In this configuration, the $I_2$ reacts with the active-oxygen mixture immediately downstream of the exit of the catalytic section. Net absorption on the I-I* transition was observed, despite the catalytically enhanced $O_2(a)$ yields.

FIG. 9 shows the measured species concentrations for $O_2(a)$, I, and I* as functions of $[I_2]_o$. When $I_2$ is injected, the $O_2(a)$ concentration decreases slightly, with the magnitude of the loss increasing with increasing $[I_2]_o$. The I and I* production both increase with $[I_2]_o$, and the sum of the I and I* concentrations is consistent with 80-100% conversion of $I_2$ to I-atoms. FIG. 10 shows the corresponding variations in the $O_2(a)$ yields and I*/I inversion ratios. The curve through the inversion ratio data is calculated from the fitted decay curves for the [I] and [I*] results in FIG. 9.

$NO_2$ can be introduced downstream of the catalyst, as a reagent to systematically reduce the residual O-atom concentration. $NO_2$ can be injected into the uncoated intermediate flow tube section through a fixed loop 8 cm downstream of the end of the catalytic section and 10 cm upstream of the observation window. $I_2$ can be injected at several positions between the $NO_2$ loop and the window, with emphasis on the position 2.5 cm upstream of the window (2 ms reaction time).

Figure 11:
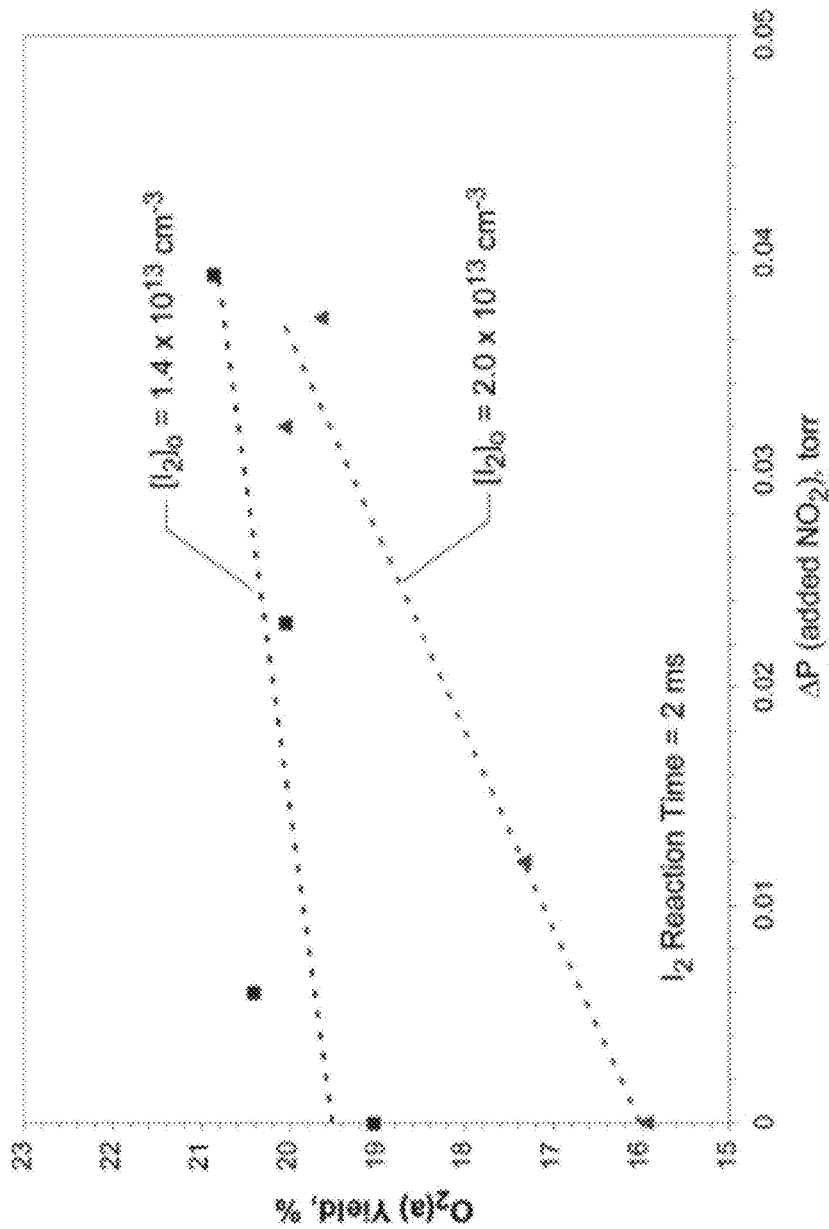
FIG. 11 is a graphical view of the effect of added $NO_2$ on $O_2(a)$ yields for two different initial $I_2$ concentrations: 5% $O_2$/He, 1.5 Torr, 2 mmole/s, 110 W discharge power, 2 ms reaction time.
Figure 12:
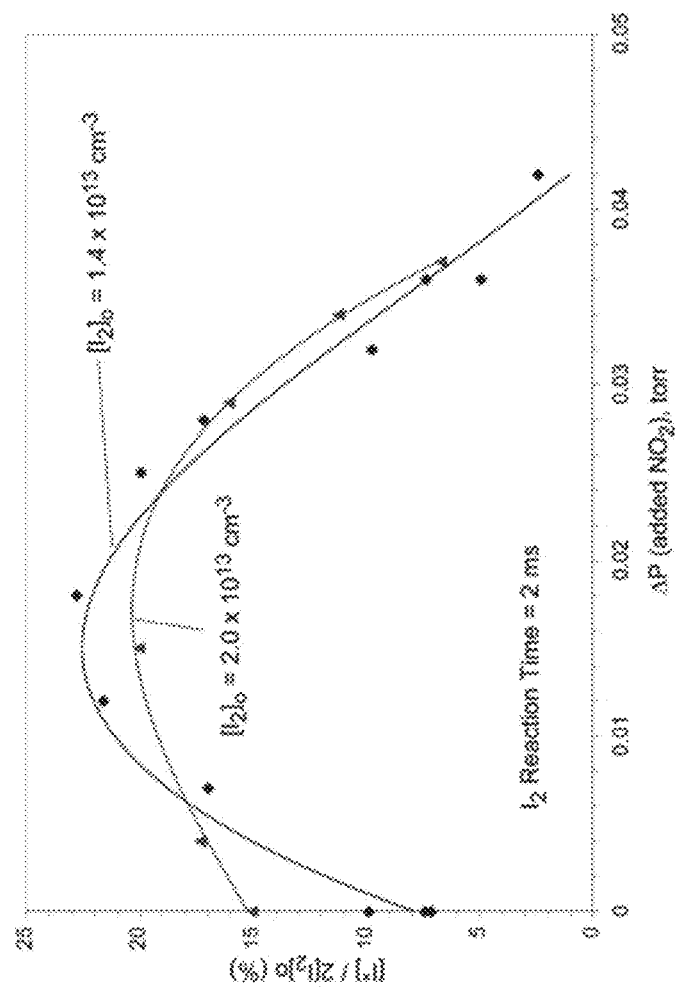
FIG. 12 is a graphical view of the effect of added $NO_2$ on I* excitation for the conditions of FIG. 11. The observed I* concentrations are normalized to the total-I content, $2[I_2]_o$.

Addition of $NO_2$ can result in an increase in $O_2(a)$ yield and a significant increase in I* concentration, e.g., up to three times larger than the case with no $NO_2$. These results are shown in FIGS. 11 and 12, for two different initial $I_2$ concentrations. For the maximum observed I* concentration (with ~1 to 1.5% $NO_2$ partial pressure relative to total gas pressure), a positive gain was observed of $0.8-1\times10^{-4}$%/cm with [I*]/[I]=0.51 and $O_2(a)$ yield of ~21% at the flow temperature of ~320 K. The I* quenching process was partially relieved by addition of $NO_2$, e.g., by removal of residual O-atoms in the gas flow. At higher $NO_2$ flow rates, the I* concentration can decrease.

Figure 13:
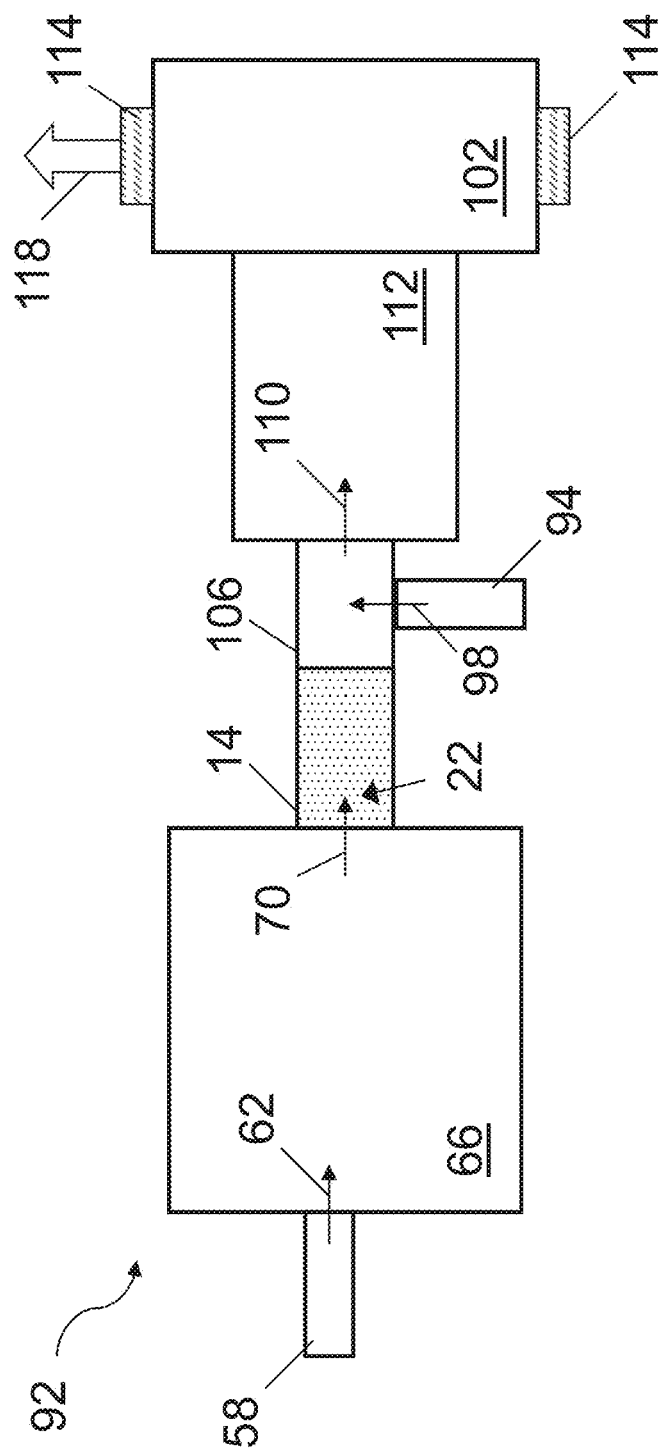
FIG. 13 is a side, sectional view of a laser device.

The catalytic coating can be used in a laser system. For example, the catalytic coating can be used to generate the gain medium of a laser system. FIG. 13 shows a laser device 92 including a cavity 14, an electrically driven discharge device 66, a source 94 for a gas 98, and an optical resonator 102.

The electrically driven discharge device 66 is configured to produce energetic singlet oxygen metastables and an oxygen containing species. A source 58 introduces a gas 62 (e.g., oxygen entrained in helium) into the electrically driven discharge 66, which provides a reactive gas 70 (e.g., energetic singlet oxygen metastables and atomic oxygen). The reactive gas 70 can flow through the cavity 14, in which atomic oxygen can form additional energetic singlet oxygen metastables. The cavity 14 includes an interior surface having a catalytic coating adapted to produce the metastables. The source 94 introduces the gas 98 to react with the energetic singlet oxygen metastables and the additional energetic singlet oxygen metastables in a flow region 106 to form an excited species 110 (e.g., excited atomic iodine) in an amount sufficient to support lasing of the excited species in the optical resonator 102. The gases can undergo expansion in an expansion zone 112, disposed between the optical resonator 102 and the flow region 106. The optical resonator 102 can include mirrors 114 and produce laser light 118.

The gas 98 can be one or more of atomic iodine (in the ground or excited state) or molecular iodine (in the ground or excited state). Ground state atomic iodine can be formed from a number of processes including a molecular iodine dissociation process observed in the chemical oxygen iodine lasers (COIL), a molecular iodine dissociation process involving reaction of atomic oxygen with molecular iodine, or a secondary discharge of molecular iodine. For example, the source 94 can be an electrically driven discharge of molecular iodine entrained in an inert gas or substantially inert gas (e.g., helium, argon or nitrogen).

The catalytic coating can be used in a catalytic version of an EOIL. For example, the catalytic coating can be used to generate the gain medium in an EOIL laser system. The catalytic coating can resolve the two principal difficulties in scaling EOIL systems by converting O into $O_2(a)$. Indeed, due to the almost complete recombination of the O-atoms on the surface, another means to dissociate $I_2$ can be useful, since the O+$I_2$ reaction sequence may no longer be viable, especially for higher $I_2$ flows that can enhance small signal gain. However, the O+I* quenching loss can be eliminated, thus no longer a limitation on the $I_2$ production.

Figure 14:
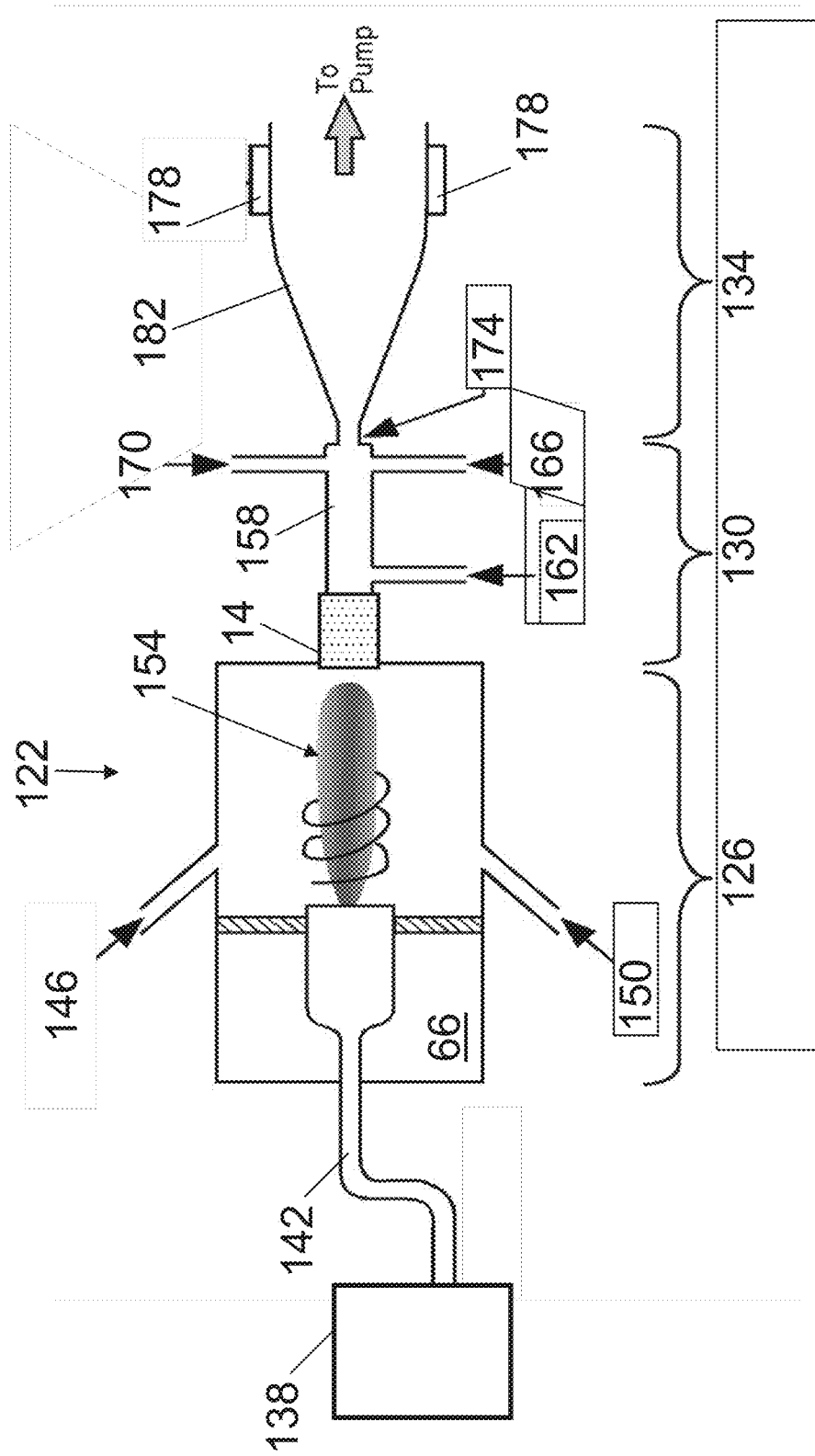
FIG. 14 is a side, sectional view of an EOIL laser device.

FIG. 14 shows a laser device 122 including a microwave driven discharge device region 126, a subsonic flow section 130, and a supersonic flow section 134. The microwave driven discharge device region 126 includes a microwave driven discharge device 66, a microwave power supply 138, and an input waveguide 142. The microwave driven discharge device 66 includes a first gas inlet nozzle 146 and a second gas inlet nozzle 150. A third gas inlet nozzle (not shown) can be used. In certain embodiments, the three gas inlet nozzles are spaced concentrically around the device 66 to provide a swirl flow in the discharge region. The incoming gas mixture flow can be equally divided among the three gas inlets.

The microwave power supply can be a magnetron, which provides power to the input waveguide 142. In one embodiment, the microwave power supply 138 can be a commercially available magnetron. Magnetrons are electrically efficient and available for high power operation in the range of 1 kW to 100 kW.

The input waveguide 142 supplies an electrical microwave discharge to a flowing oxygen and inert gas (e.g., helium, argon or nitrogen) mixture that is injected into the microwave cavity through the gas inlet nozzles 146 and 150. Singlet oxygen metastables and atomic oxygen are generated in the plasma 154. The singlet oxygen metastables and atomic oxygen are received by the subsonic flow section 130.

In some embodiments, NO is injected into the microwave driven discharge device 66 with oxygen and an inert gas, e.g., through inlet nozzle 146 or 150. Adding NO can reduce the O+I* quenching effect and improve efficiency of the discharge. The NO flow rate can be optimized to produce maximum gain for a given I* flow rate. For example, the NO flow rate can be decreased with increasing $I_2$ flow rate. The NO flow rate can be in the range of about 0.4 to 0.5 mmole/s.

The subsonic flow section 130 includes a flow tube or subsonic flow cavity 158, including cavity 14. In certain embodiments, cavity 14 can interact with atomic oxygen to form additional singlet oxygen metastables. The subsonic flow section 130 can include three gas inlet nozzles 162, 166 and 170, and a nozzle 174. The gas inlet nozzle 162 can be used to introduce a buffer gas, such as $NO_2$. The gas inlet nozzles 166 and 170 can inject molecular iodine into the subsonic flow section 130. In some embodiments, the subsonic flow cavity 158 has a short section, allowing for a 1 inch axisymmetric flow of the singlet oxygen metastables. The short section can merge to a water cooled transition section that transforms the flow into a rectangular duct approximately 1 cm×5 cm. The nozzle 174 can be 1.5 mm to produce Mach 2.6 flow.

The supersonic flow section 134 receives expanding gas from the nozzle 174 of the subsonic flow section 130. The supersonic flow section 134 includes an optical resonator region 102 including windows 178. In some embodiments, the windows 178 can be the end mirrors 114 of the optical resonator 102. The supersonic flow section 134 includes a flow tube 182 in communication with a pump (e.g., an open system). In some embodiments, the apparatus 122 is pumped through a high-conductance gate valve and foreline by a 2150 cfm(air) blower and forepump combination.

In some embodiments, the flow in the supersonic flow section 134 can diverge with a half-angle of 2 or 4 degrees. The angle of divergence can be sufficient to offset boundary layer growth. Additionally, the distance from the nozzle 174 to the end of the supersonic flow section 134 can be 12 cm. In some embodiments, the supersonic flow section 134 is aluminum and internally coated with Teflon to mitigate $O_2(a)$ wall losses.

The optical resonator 102 can include, for example, two mirrors 114. The mirrors can be 1 inch diameter and have a reflectivity of 99.9997%. Each mirror can be mounted on a three-point tilt control and set back approximately 6.5 inches from the side edge of the two dimensional supersonic flow field, on opposite sides of the flow. The mirrors can be centered approximately 4.35 cm downstream from the nozzle. In some embodiments, the $I_2$ can be injected into the subsonic flow section 130. The subsonic flow section 130 can be about 1 cm, 4 cm or 8 cm from the microwave driven discharge device section 66.

For a 5% $O_2$/He mixture at 47 mmole/s, NO approximately equal to 0.4 mmole/s through the microwave driven discharge device at 33 Torr, 24 Torr in the subsonic flow section 220, 1 kW of discharge power, and $I_2$ heated in the range of 308 to 318 K, laser output can be about 20 mW. The total singlet oxygen power in the flow can be about 41 W. For a discharge flow rate of 82 mmole/s and 70 Torr in the microwave driven discharge device section, laser output can be approximately 110 mW. Multiple microwave driven singlet oxygen metastable generators can be used in an EOIL laser system.

Atomic iodine can be generated using a secondary discharge and input through nozzles 162, 166 or 170. The dissociation of $I_2$ can increase by using a secondary electric discharge to pre-dissociate the $I_2$ during injection into the main gas flow. The pre-dissociation and injection can minimize recombination of the I-atoms in the injector.

Figure 15:
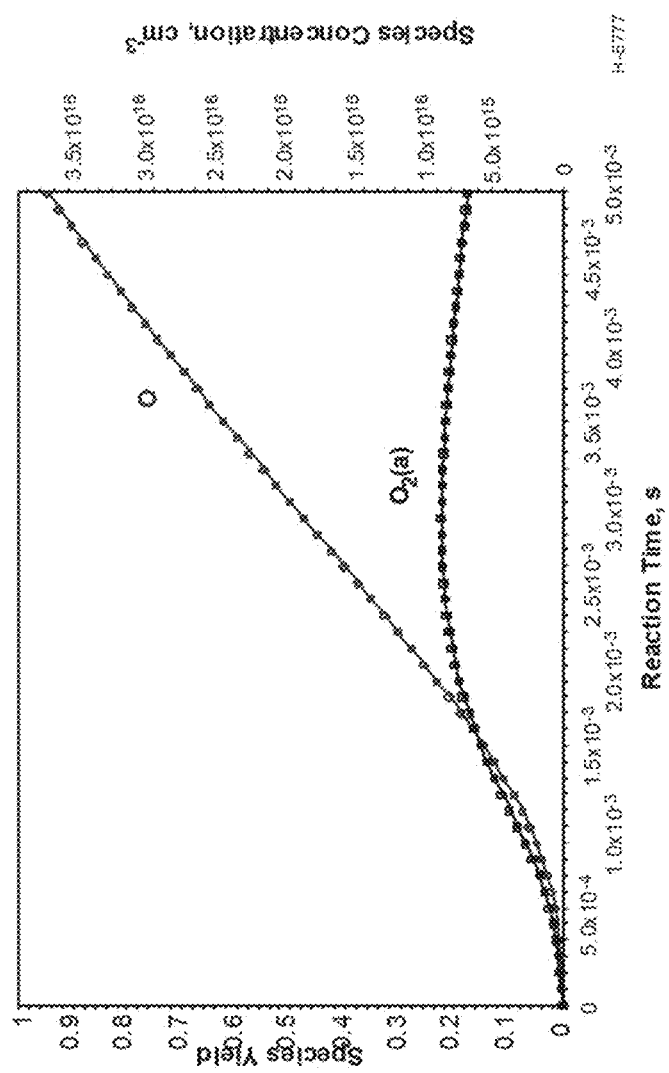
FIG. 15 is a graphical view of a model of $O_2(a)$ and O atom production.

FIG. 15 illustrates a model of the impact of the catalytic coating. FIG. 15 shows $O_2(a)$ and O atom production in one example of an embodiment of the invention using a MIDJet device, e.g., 1 kW MIDJet Discharge, 10% $O_2$/He, and E/N-33 Td. For these exemplary conditions, maximum production of $O_2(a)$ can occur when the residence time for the $O_2$/He mixture can be about 2.5 ms. For this condition, the $O_2(a)$ yield can be about 20%, the concentration of $O_2(a)$ can be $\sim 1 \times 10^{16}$ cm$^{-3}$, and the O atom concentration can be $\sim 1.5 \times 10^{16}$ cm$^{-3}$. Additionally, the catalytic recombination of O atoms downstream of the discharge can add an $O_2(a)$ concentration of $0.75 \times 10^{16}$ cm$^{-3}$, representing ~75% increase in both the concentration and the $O_2(a)$ yield (to ~35%). An even greater increase can be realizable if more O atoms are produced in the discharge. For example, if the gas residence time in the discharge were increased to 4 ms, the $O_2(a)$ yield can increase from approximately 18% to nearly 60% at a concentration of $\sim 2.3 \times 10^{16}$ cm$^{-3}$. Similarly, operation at higher E/N to produce more atomic oxygen can result in even greater enhancement of singlet yields by the catalytic process. In addition, the catalytic coating provides additional flexibility to operate the reactor at higher $O_2$ mole fractions, with somewhat lower yields (still far above threshold), but larger $O_2(a)$ number densities and power in the flow.

EOIL's use in gas-phase electric discharge generation of the active oxygen species offers substantial improvements in efficiency and weight limitations for atomic iodine laser systems. EOIL invention can be compatible with non-hazardous, liquid-free chemical requirements, on-board power generation, turn-key operation, substantial weight reduction, and closed-cycle systems. These properties can be used in many advanced Department of Defense applications, including airborne and space deployment.

While the invention has been particularly shown and described with reference to specific embodiments, it should be understood by those skilled in the art that various changes in form and detail may be made therein without departing from the spirit and scope of the invention as defined by the appended claims.

What is claimed is:
1. A laser device comprising:
an optical resonator;
an electrically driven discharge device configured to produce energetic singlet oxygen metastables and an oxygen containing species;
a catalytic reactor cavity disposed relative to the electrically driven discharge device, the catalytic reactor cavity comprising an interior surface having a catalytic coating adapted to produce additional energetic singlet oxygen metastables by a chemical reaction from the oxygen containing species; and
a source for a second gas disposed between the optical resonator and the catalytic reactor cavity, the second gas reacting with the energetic singlet oxygen metastables and the additional energetic singlet oxygen metastables to form an excited species in an amount sufficient to support lasing of the excited species in the optical resonator.
2. The laser device of claim 1 wherein the catalytic coating comprises an oxygen and iodine containing species in a ratio of about 2:1.
3. The laser device of claim 1 wherein the catalytic coating comprises at least one of $I_2O_4$ and $I_4O_9$.
4. The laser device of claim 1 wherein an inner volume of the catalytic reactor cavity defines a structure comprising the inner surface configured to receive the catalytic coating.
5. The laser device of claim 4 wherein the structure defines a shape (i) including having at least one wall having a high surface area and (ii) defining at least one aperture having high flow conductance.
6. The laser device of claim 4 wherein the structure comprises a vane, a sponge or a honeycomb shape.

* * * * *